United States Patent
Conway et al.

(10) Patent No.: US 9,659,674 B2
(45) Date of Patent: May 23, 2017

(54) INSTRUMENTATION AND CONTROL PENETRATION FLANGE FOR PRESSURIZED WATER REACTOR

(75) Inventors: Lawrence E. Conway, Monroeville, PA (US); Alexander W. Harkness, Gibsonia, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 1044 days.

(21) Appl. No.: 13/457,683

(22) Filed: Apr. 27, 2012

(65) Prior Publication Data

US 2013/0287157 A1    Oct. 31, 2013

(51) Int. Cl.
| | | |
|---|---|---|
| G21C 7/12 | (2006.01) | |
| G21C 13/028 | (2006.01) | |
| G21C 13/036 | (2006.01) | |
| G21C 17/116 | (2006.01) | |
| G21C 1/32 | (2006.01) | |

(52) U.S. Cl.
CPC ......... *G21C 13/028* (2013.01); *G21C 13/036* (2013.01); *G21C 17/116* (2013.01); *G21C 1/322* (2013.01); *G21C 7/12* (2013.01); *Y02E 30/40* (2013.01)

(58) Field of Classification Search
None
See application file for complete search history.

(56) References Cited

U.S. PATENT DOCUMENTS

| | | | |
|---|---|---|---|
| 3,158,543 A | * | 11/1964 | Sherman et al. ............. 376/178 |
| 3,397,114 A | * | 8/1968 | Deighton ...................... 376/291 |
| 3,660,231 A | * | 5/1972 | Fox et al. ..................... 376/384 |
| 3,806,167 A | | 4/1974 | Notari et al. |
| 4,106,983 A | * | 8/1978 | Meuschke et al. ........... 376/247 |
| 4,765,947 A | | 8/1988 | Babin et al. |
| 5,052,891 A | * | 10/1991 | Burkholder ............... 416/198 A |
| 5,706,319 A | * | 1/1998 | Holtz ............................. 376/203 |
| 6,301,319 B1 | * | 10/2001 | Merkovsky et al. ......... 376/205 |

(Continued)

FOREIGN PATENT DOCUMENTS

| | | |
|---|---|---|
| GB | 1139406 | 1/1969 |
| GB | 2100496 | 12/1982 |
| JP | H01107912 | 4/1989 |

(Continued)

OTHER PUBLICATIONS

International Search Report for PCT/US2013/036062 dated Sep. 27, 2013 (Form PCT/ISA/210).

(Continued)

*Primary Examiner* — Sean P Burke
(74) *Attorney, Agent, or Firm* — Joseph C. Spadacene; Westinghouse Electric Company LLC

(57) ABSTRACT

A nuclear reactor having a penetration seal ring interposed between the reactor vessel flange and a mating flange on the reactor vessel head. Radial ports through the flange provide passage into the interior of the reactor vessel for utility conduits that can be used to convey signal cables, power cables or hydraulic lines to the components within the interior of the pressure vessel. A double o-ring seal is provided on both sides of the penetration flange and partial J-welds on the inside diameter of the flange between the flange and the utility conduits secure the pressure boundary.

12 Claims, 7 Drawing Sheets

(56) References Cited

U.S. PATENT DOCUMENTS

2011/0056590 A1 3/2011 Kanzaki et al.
2012/0076254 A1 3/2012 Malloy et al.

FOREIGN PATENT DOCUMENTS

JP 2003314692 11/2003
JP 2011245504 12/2011

OTHER PUBLICATIONS

Written Opinion of the International Searching Authority for PCT/US2013/036062 dated Sep. 27, 2013 (Form PCT/ISA/237).
International Preliminary Report on Patentability for PCT/US2013/036062 dated Nov. 6, 2014 (Forms PCT/IB/326, PCT/IB/373, PCT/ISA/237).

* cited by examiner

INSTRUMENTATION AND CONTROL PENETRATION FLANGE FOR PRESSURIZED WATER REACTOR

BACKGROUND

1. Field

This invention relates in general to nuclear reactor systems, and, in particular to utility penetrations through a reactor vessel.

2. Description of Related Art

In a nuclear reactor for power generation, such as a pressurized water reactor, heat is generated by fission of a nuclear fuel such as enriched uranium, and transferred to a coolant flowing through a reactor core. The core contains elongated nuclear fuel rods mounted in proximity with one another in a fuel assembly structure, through and over which coolant flows. The fuel rods are spaced from one another in co-extensive parallel arrays. Some of the neutrons and other atomic particles released during nuclear decay of the fuel atoms in a given fuel rod pass through the spaces between fuel rods and impinge on the fissile material in adjacent fuel rods, contributing to the nuclear reaction and to the heat generated by the core.

Moveable control rods are dispersed through the core to enable control of the overall rate of the fission reaction, by absorbing a portion of the neutrons passing between fuel rods, which otherwise would contribute to the fission reaction. The control rods generally comprise elongated rods of neutron absorbing material and fit into longitudinal openings or guide thimbles in the fuel assemblies running parallel to and between the fuel rods. Inserting a control rod further into the core causes more neutrons to be absorbed without contributing to the fission process in an adjacent fuel rod; and retracting the control rod reduces the extent of neutron absorption and increases the rate of the nuclear reaction and the power output of the core.

The control rods are supported in cluster assemblies that are moveable to advance or retract a group of control rods relative to the core. For this purpose, control rod drive mechanisms are provided, typically as part of an upper internal arrangement located, at least in part, within the reactor vessel above the nuclear core. The reactor vessel of the pressurized water reactor is pressurized to a high internal pressure, and the control rod drive mechanisms are housed in part in pressure housings that are tubular extensions of the reactor pressure vessel. FIG. 1 is a schematic view of a prior art nuclear containment 10 housing a nuclear reactor pressure vessel 12 of a conventional pressurized water reactor having a nuclear core 14 supported within the lower half of the pressure vessel 12. A control rod assembly 16, i.e., one of the cluster assemblies, is figuratively shown within the core 14 and supports a cluster of control rods 18 that are moved into and out of the fuel assemblies (not shown) by a drive rod 20. The drive rod 20 is moveably supported by drive rod housing 24 that extends upwardly and through a removable reactor closure head 22. Control rod drive mechanisms (CRDM) are positioned above the reactor head around the control rod drive housings 24 and move the drive rods in a vertical direction to either insert or withdraw the control rods 18 from the fuel assemblies within the core 14. Rod position indicator coils 26 or other indicator mechanisms are positioned around the housing 24 to track the position of the drive rod 20, and thus the control rods 18 relative to the core 14. The output of the position indicator coils 26 is fed through a processor rod position indicator (RPI) electronics cabinet 28 within the containment 10. The output of the rod position indicator electronics cabinet 28 is then fed outside the containment to a logic cabinet 30 and an RPI processing unit 32. The logic cabinet 30 interfaces with the control system 34 which provides manual instructions from a user interface 36 as well as automatic instructions which are generated from intelligence obtained from plant sensors not shown. The logic cabinet 30 receives the manual demand signals from an operator through the user interface 36 and a reactor control system 34 or automatic demand signals from the reactor control system 34 and provides the command signals needed to operate the control rods 18 according to a predetermined schedule. The power cabinet 38 provides a programmed current to operate the CRDM, all in a well known manner.

One type of mechanism employed in traditional pressurized water reactors for positioning a control rod assembly 16 is a magnetic jack-type mechanism, operable to move the control drive rod by an incremental distance, of approximately ⅝ inch (1.63 cm), into or out of the core in discrete steps. In one embodiment, the control rod drive mechanism has three electromagnetic coils and armatures or plungers actuated by the electromagnetic coils, that are operated in a coordinated manner to raise and lower the drive rod shaft 20 and a control rod cluster assembly 16, coupled to the drive rod shaft 20. The three coils (CRDM) are mounted around and outside the pressure housing 24. Two of the three coils operate grippers that when powered by the coils engage the drive rod shaft, with one of the grippers being axially stationary and the other axially moveable under the influence of the third coil.

In a magnetic jack-type mechanism, the drive rod shaft has axially spaced circumferential grooves that are clasped by latches on the grippers, spaced circumferentially around the drive shaft. The third coil actuates a lift plunger coupled between the moveable grippers and a fixed point. If the power to the control rod mechanism is lost, the two grippers both release and the control rod drops by gravity into their maximum nuclear flux damping position. So long as control rod power remains activated, at least one of the stationary grippers and the moveable grippers hold the drive shaft at all times.

The three coils are operated in a timed and coordinated manner ultimately to hold and to move the drive shaft. The stationary grippers and the moveable grippers operate substantially alternately, although during the sequence of movements both types of grippers engage the drive shaft during a change from holding stationary to movement for an advance or retraction. The stationary gripper can hold the drive shaft while the moveable gripper is moved to a new position of engagement. The moveable grippers engage the drive shaft when moving it up or down as controlled by the lift plunger. After the moveable gripper engages the drive shaft, the stationary gripper is released and then the plunger is activated or deactivated to effect movement in one direction or the other.

A number of particular coil arrangements and gripper designs are possible, however, whatever mechanical arrangement is employed for the grippers and the lifting coils/armature arrangement, the lifting coils are housed outside the pressure boundary of the reactor vessel where they can be cooled, usually by forced ventilation and are magnetically coupled to the latch assemblies through the pressure housings that surround the drive rods and are vertical extensions of the pressure vessel head. However, one of the next generation of nuclear reactors under development is a small modular reactor that has the core, upper internals, steam generator, pressurizer and inlets and outlets of the primary loop circulation pumps housed within the same pressure vessel. In such an arrangement, the entire control rod drive mechanism is immersed within the reactor coolant, in which the conventional arrangement of coils could not operate reliably. Even if the coils were housed to protect them from direct contact with the coolant, conventional coils could not withstand the temperatures they would experience in an operating cycle. Application Ser. No. 13/314,519, filed Dec. 8, 2011, entitled *Nuclear Reactor Internal Control Rod Drive Mechanism Assembly*, overcomes those problems, however, the arrangement of components in such small modular reactors preclude the incorporation of vessel penetrations through either the upper or lower vessel heads for routing the cabling needed to power the electromagnetic CRDM coils or other in-vessel instrumentation and controls, the traditional path for supplying electrical power and transporting signals to and from internal components. Typical integral pressurized water reactor designs require that the steam generator be located directly above the reactor core complicating access to the core from above. In addition, in plant designs where in-vessel retention is claimed as a safety feature, bottom vessel penetrations are prohibited thus precluding access to the core through the bottom head.

FIGS. 2 and 3 illustrate a schematic of such a small modular reactor. FIG. 2 shows a perspective, partially cut away, to show the pressure vessel and its internal components. FIG. 3 is an enlarged view of the pressure vessel shown in FIG. 2. The pressurizer 54 is integrated into the upper portion of the reactor vessel head and eliminates the need for a separate component. A hot leg riser 56 directs primary coolant from the core 14 to a steam generator 58 which surrounds the hot leg riser 56. Six reactor coolant pumps 60 are circumferentially spaced around the reactor vessel at an elevation near the upper end of the upper internals 62. The reactor coolant pumps are horizontally mounted axial flow canned motor pumps. The reactor core 14 and the upper internals 62, except for their size, are substantially the same as the corresponding components in an AP1000® reactor supplied by Westinghouse Electric Company LLC, Cranberry Township, Pa. From the foregoing, it should be apparent that the traditional means for routing the cabling from internal components to the exterior of the reactor cannot readily be employed.

Accordingly, a new cable routing design is desired that will simply transmit electrical power, electrical signals and/or hydraulic fluids from the interior of the reactor vessel to the exterior thereof.

Further, such a cable routing scheme is desired that will not impede reactor vessel disassembly and reassembly during plant refueling operations.

Additionally, such a cable routing scheme is desired that will facilitate inspection and maintenance of the in-vessel components.

SUMMARY

These and other objects are achieved by a nuclear reactor having an elongated reactor vessel sealed at a lower end and having an open upper end on which an annular flange is formed and a central axis extending along the elongated dimension. The reactor vessel has a head with an annular portion on the underside of the head machined to form a sealing surface. A removable annular seal ring, sized to seat on the reactor vessel flange between the flange and the sealing surface on the underside of the reactor vessel head, is interposed between the sealing surface on the underside of the vessel head and the flange on the vessel. The seal ring has a thickness that is sized to sealably accommodate radial passages through which utility conduits pass from outside the reactor vessel to an interior thereof to transport one or more utilities comprising hydraulic fluid for hydraulic mechanisms, instrumentation signals or power for electrical mechanisms. The removable annular seal includes one or more of such radial passages. The reactor typically includes an internals assembly having a lower internals which includes a reactive core and an upper internals situated above the core. The internals assembly is seated within the reactor vessel and preferably the removable annular seal ring is attached to the reactor internals assembly.

In one embodiment, an annular passage is provided between the interior wall of the reactor vessel and the internals assembly for a downward flow of relatively cool reactor coolant to access an underside of the reactive core, wherein at least a portion of the removable annular seal ring extends over the annual passage where it is attached to the reactor internals assembly. Desirably, in such an arrangement, the portion of the removable annual seal ring that extends over the annual passage includes axially extending openings for the passage of the reactor coolant. Desirably, the axially extending openings are circumferentially spaced from the radial passages.

In still another embodiment, the removable annular seal ring is attached to the upper internals and is removable from the reactor vessel with removal of the upper internals. Preferably, in such an arrangement, the utility conduits are an integral part of the upper internals and include a utility disconnect outside the reactor vessel.

Preferably, the annual seal ring has an upper and a lower double o-ring seal on opposite sides that mate with the reactor vessel flange on one of the opposite sides and the annular portion of the reactor vessel head on the other of the opposite sides. Desirably, the annular seal ring has a hole extending between the upper and lower double o-ring seals allowing leakage to be detected through both sets of seals through one reactor vessel flange leak-off line. Preferably, the leak-off line extends from the lower double o-ring seal.

Preferably, the removable annular seal ring is forged from a metal having substantially the same thermal expansion properties as the reactor vessel. In that regard, the removable annular seal ring may be forged from either (i) carbon steel in which the surfaces in contact with reactor coolant are clad with stainless steel, or (ii) alloy 690.

Desirably, the annular seal ring has a plurality of holes axially through the annular seal ring in line with openings in the reactor vessel head and the reactor vessel flange through which studs pass that anchor the head to the flange with the seal ring captured therebetween. Desirably, one or more of the radial passages extend in between two adjacent ones of the holes. Preferably, the utility conduits are sealed to the radial passages on the inner diameter of the seal ring.

BRIEF DESCRIPTION OF THE DRAWINGS

A further understanding of the invention claimed hereafter can be gained from the following description of the preferred embodiments when read in conjunction with the accompanying drawings in which:

DESCRIPTION OF THE PREFERRED EMBODIMENT

Figure 1:
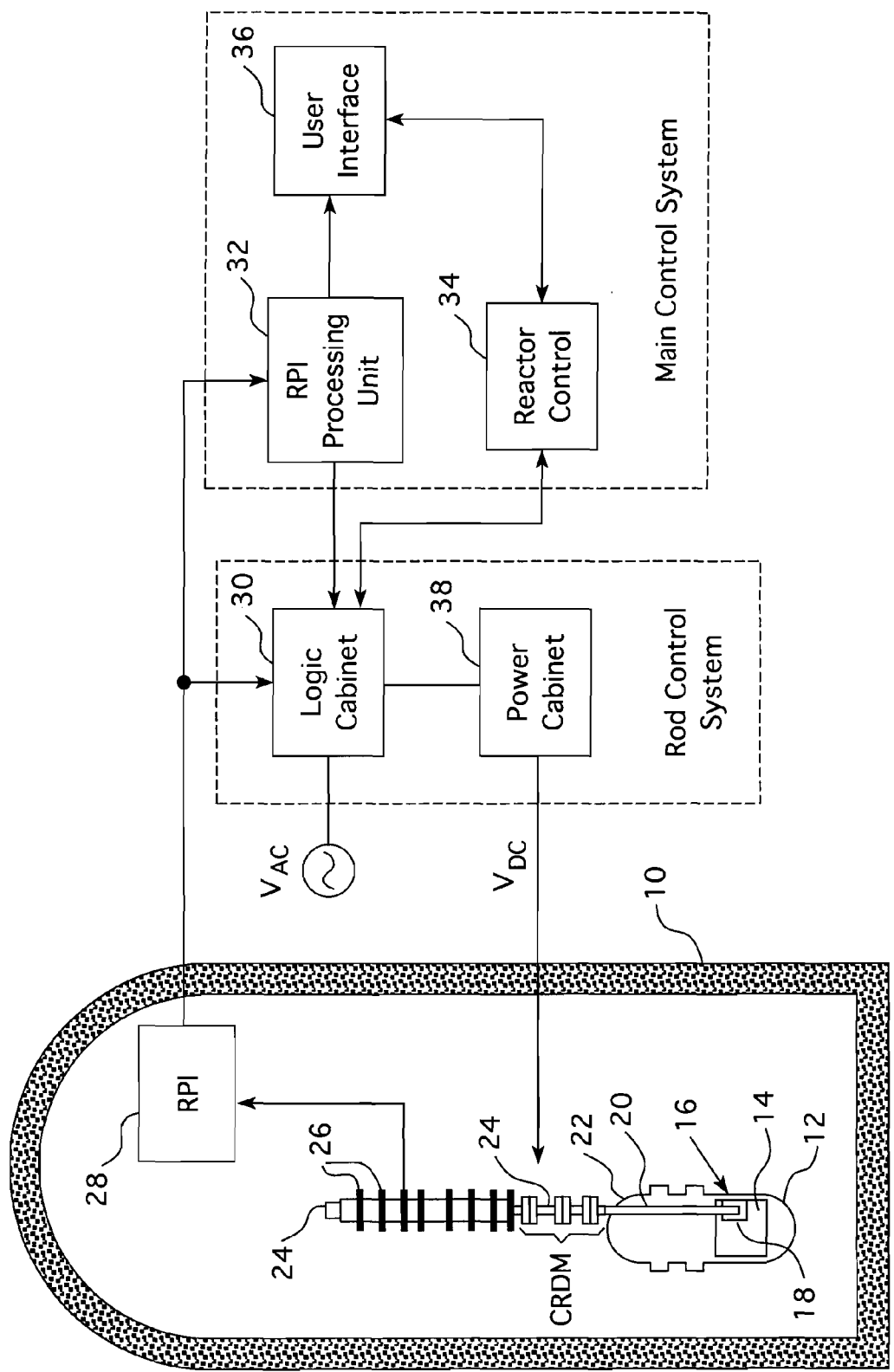
FIG. 1 is a schematic view of a traditional pressurized water reactor nuclear containment showing an outline of a nuclear reactor vessel supporting a control rod drive system for inserting and withdrawing a control rod assembly into and out of the core of the reactor vessel.
Figure 2:
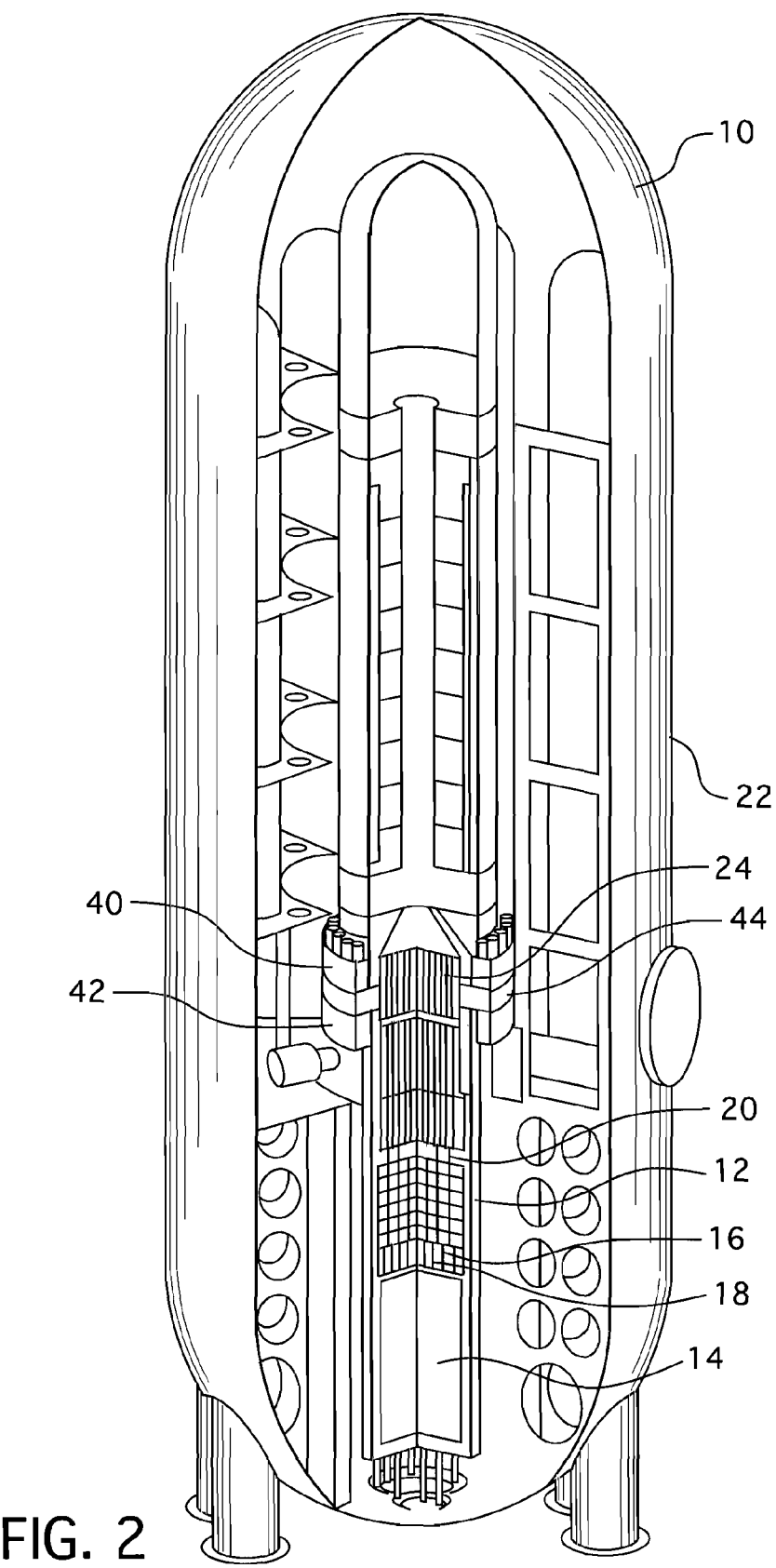
FIG. 2 is a perspective view partially cut away, showing a small modular reactor system.
Figure 3:
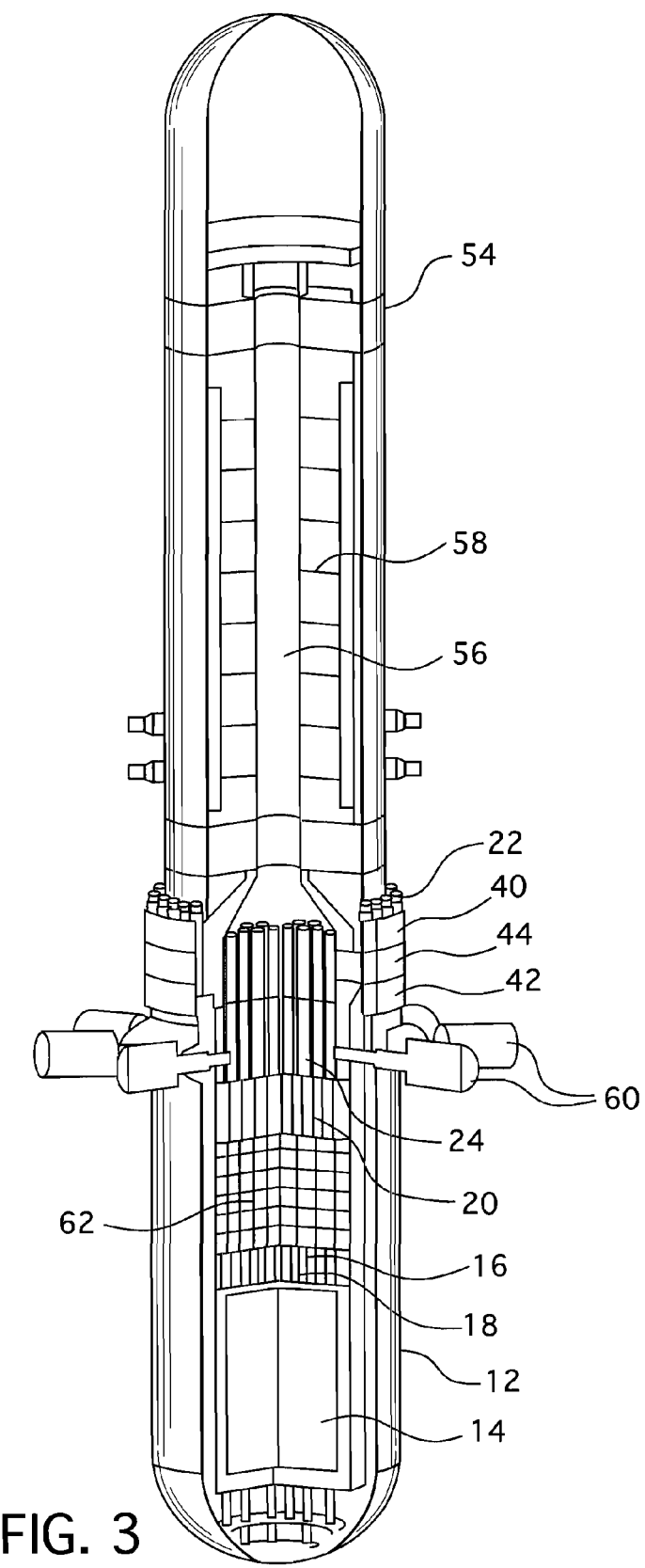
FIG. 3 is an enlarged view of the reactor shown in FIG. 2.

As previously mentioned, the configuration of some reactor designs, including small, integral, modular reactors, precludes the incorporation of vessel penetrations through either the upper or lower vessel heads for instrumentation and controls. Some small modular reactor designs also require electrical power supply to internal components such as control rod drive mechanism, reactor coolant pumps, and pressurizer heaters. This invention provides an alternative location for all penetrations, including electrical power, through a ring 44 that is clamped between the upper and lower reactor vessel closure flanges 40 and 42, respectively (FIGS. 2 and 3). The preferred embodiment of the invention described herein also provides a convenient means of reactor vessel disassembly and reassembly of the reactor vessel during plant refueling operations and allows for inspection and maintenance of the in-vessel components.

The following physical description of the preferred embodiment is specific to a particular small integral reactor design, however, it should be recognized that the novel elements of this invention can be applied to other reactors whether or not they have similar design restrictions. Like reference characters are used among the several drawings to refer to corresponding components.

Figure 4:
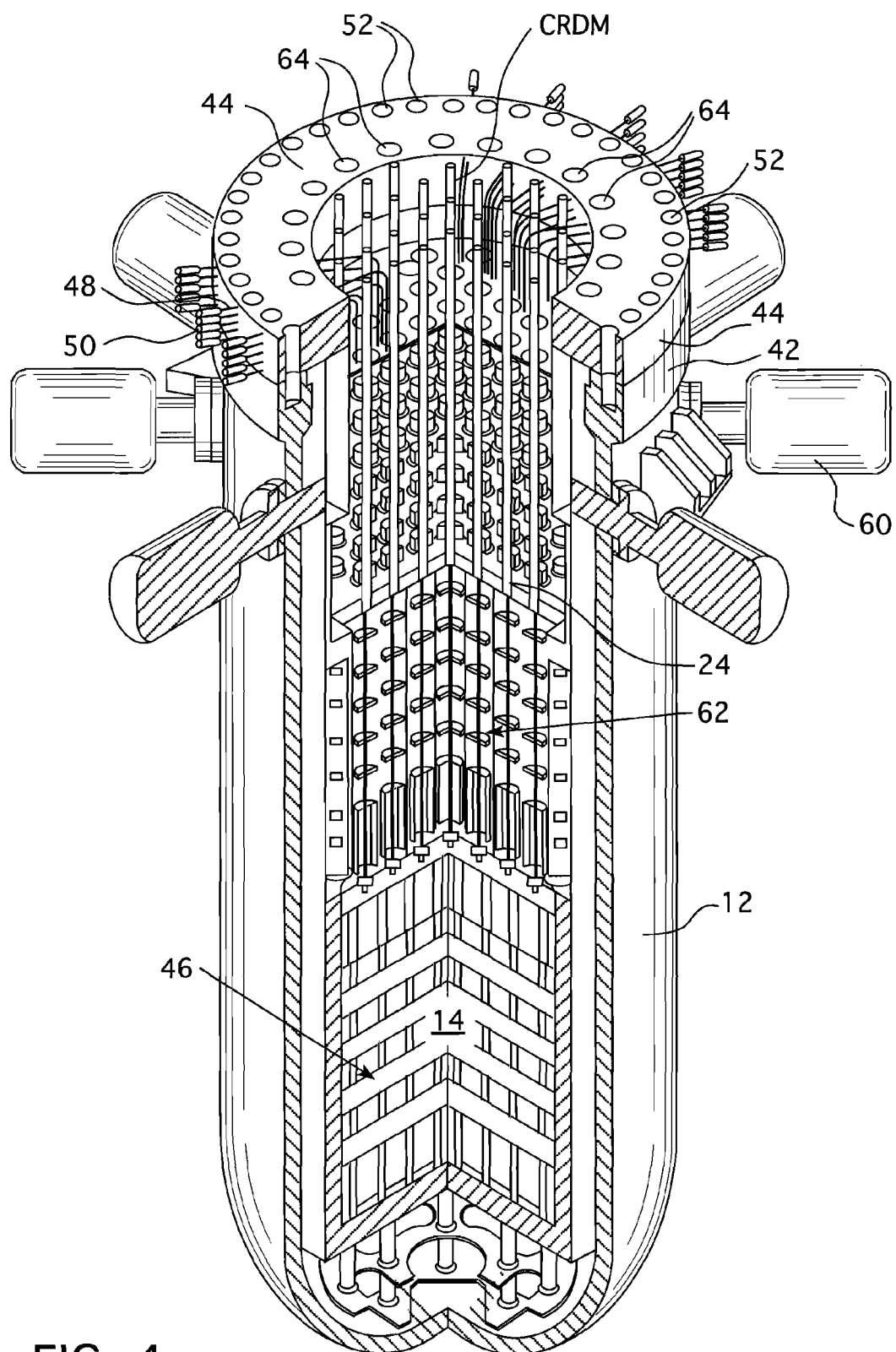
FIG. 4 is a perspective view of the reactor vessel and its internal components with a portion cut away to show the internals.
Figure 6:
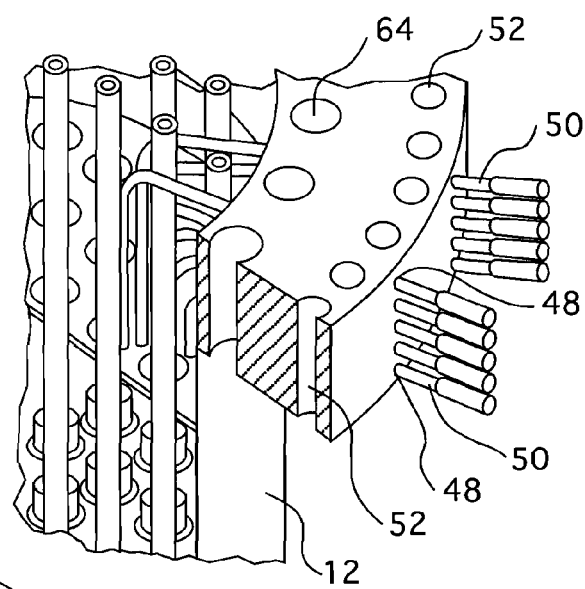
FIG. 6 is an enlarged view of an upper portion of FIG. 5.
Figure 5:
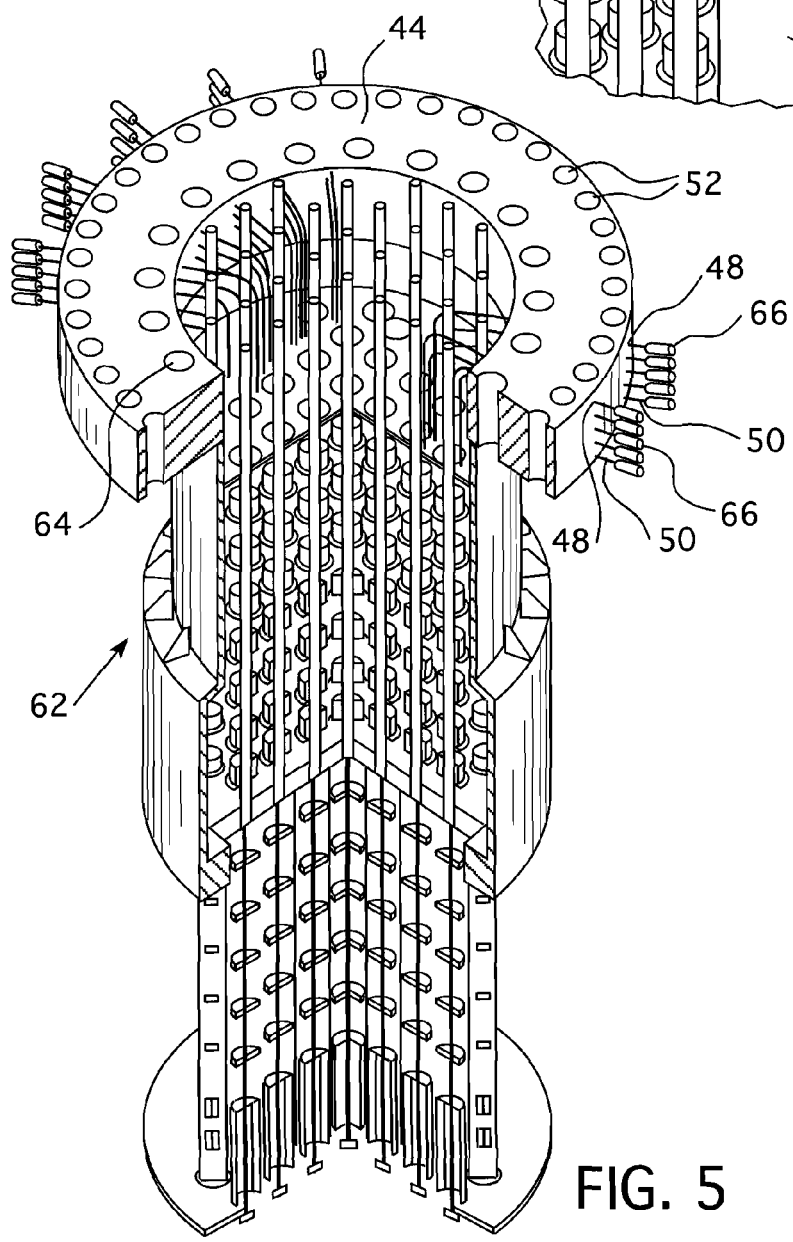
FIG. 5 is a perspective view of the reactor vessel internals and removable seal ring removed from the reactor vessel.
Figure 7:
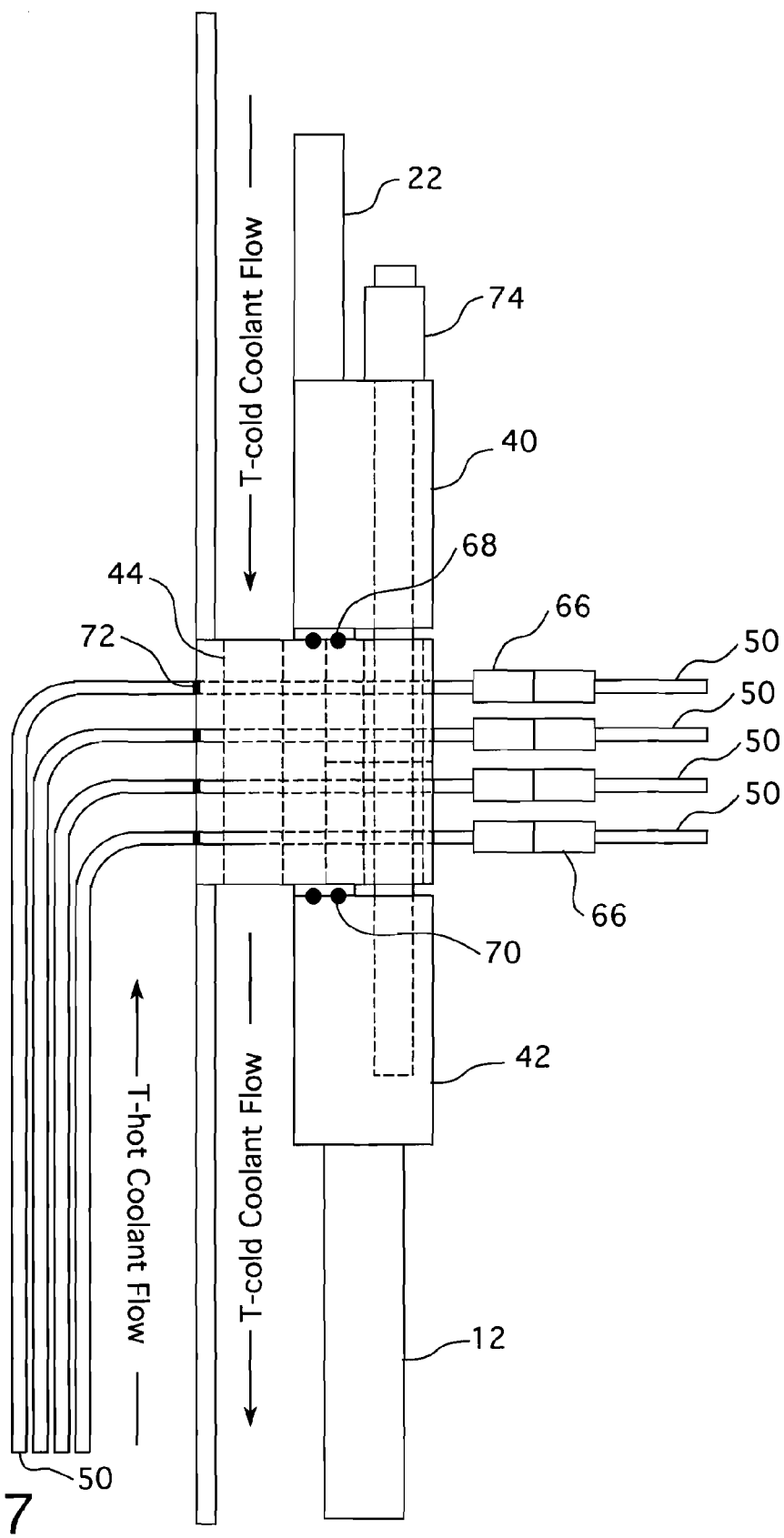
FIG. 7 is a schematic view of the seal interface between the reactor vessel head, the removable seal and the reactor vessel flange showing the utility conduits passing therethrough.

FIG. 4 shows a reactor vessel 12 and its internal components, including the lower internals 46, that includes the core 14, and the upper internals 62, that includes the control rod guide tubes, the drive rod housings 24 and the control rod drive mechanisms (CRDM). This invention provides an annular penetration flange seal 44 with radially extending ports 48 through which utility conduits 50 transport electrical power, instrumentation signals, control signals or hydraulic fluids to or from the interior of the pressure vessel to the exterior thereof. In the preferred embodiment, the penetration flange, or seal ring 44, is a forged ring of either carbon steel (such as SA-508) in which the surfaces in contact with borated reactor coolant are clad with stainless steel or a ring forged from solid alloy 690. These materials have similar thermal expansion properties to the reactor vessel material which is important to the design. The ring 44 is machined to have the necessary detail, such as o-ring retention grooves, to include a double o-ring seal 68 and 70 on both the top and bottom surfaces (FIG. 7). Towards the outside diameter, clearance holes 52 equal to the number of reactor closure studs are machined to allow the studs 74 to pass through the ring 44 (FIGS. 4, 5, 6 and 7). The inner diameter of the ring 44 is secured to the upper internals 62 either through mechanical fasteners or a bi-metallic weld.

Figure 8:
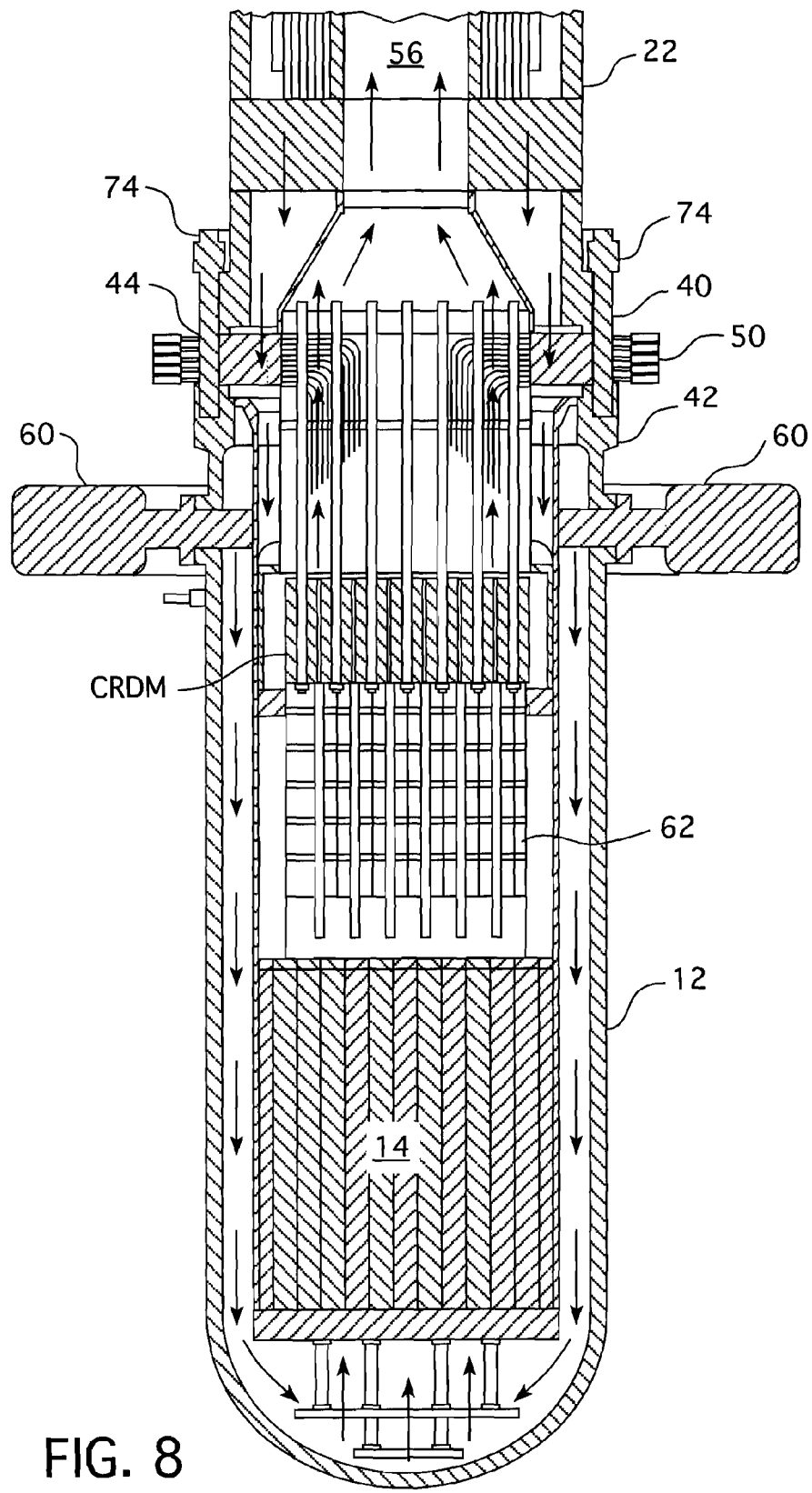
FIG. 8 is a cross-sectional view of the reactor vessel and its internal components.

The utility conduit penetrations 48 through the ring 44 extend radially between the reactor closure stud clearance holes 52. More than one penetration can penetrate through the space between two closure stud holes 52. The arrangement of penetrations will be a function of the requirements of the particular reactor design. In the small modular reactor internals design described herein, flow holes 64 are also required towards the inner diameter of the penetration flange seal ring 44 to allow coolant flow from the steam generator to pass through the penetration flange 44 as best can be seen from FIG. 8. These holes 64 need to be spaced to avoid the radial penetrations 48. The utility conduits, which pass through those penetrations would likely be made from alloy 690, and are sealed on the inner diameter of the penetration ring 44 using a partial penetration J-groove weld 72. The weld 72 forms the primary pressure boundary. From this point, the pressure boundary is maintained by a continuous tube which forms a continuous conduit to the equipment serviced by the utility medium transported through the conduit. The penetration flange 44 could also be used to introduce in-core instrumentation cabling into a thimble tube that can be retracted during refueling by adding a grafoil seal at the penetration. The o-ring seals 68 and 70 can best be observed in FIG. 7 which also shows electrical disconnects 66 on the outside of the reactor which are employed when the internals 62 need to be removed from the vessel to remove the internals 62 with the penetration flange 44.

During refueling, the upper internals 62 and the components it supports can be removed from the reactor vessel 12 as a single assembly after the electrical cable terminals 66 have been disconnected. For example, in the case of the small modular reactor described herein, the electrical power and position indication instrumentation cables that service the control rod drive mechanisms all remain attached to the upper internals and can be removed without breaking the pressure boundary within the reactor vessel envelope. To accommodate in-core instrumentation which needs to be retracted from the reactor core during refueling, a mechanical seal can be added to the radial penetration in the penetration flange 44. This seal will allow the instrument to be withdrawn by pulling it through the penetration in the flange.

The penetration flange 44 also provides access through the pressure boundary to both relatively hot and cold reactor coolant for temperature measurement. Thermowells can either extend through the outer diameter of the penetration flange 44 to a flow hole 64 to monitor the reactor's cold temperature or through the inside diameter to monitor the reactor's hot temperature. The flow holes 64 in the penetration flange 44 also provide an opportunity for flow measurements. A pitot tube flow probe device can penetrate from the outside diameter into a flow hole 64 to monitor the reactor's coolant flow rate.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A nuclear reactor comprising:
   an elongated reactor vessel having a lower portion sealed at a lower end and having an open upper end on which an annular flange is formed and a central axis extending along an elongated dimension;

a reactor vessel head having an annular portion on an underside of the head that is machined to form a sealing surface;

a removable annular seal ring, sized to seat on the reactor vessel flange between the flange and the sealing surface on the underside of the reactor vessel head, the seal ring being interposed between the sealing surface on the underside of the vessel head and the flange on the reactor vessel lower portion and having a thickness sized to sealably accommodate radial passages through which utility conduits pass from outside of the reactor vessel to an interior thereof to transport one or more utilities comprising hydraulic fluid for hydraulic mechanisms, instrumentation signals or power for electrical mechanisms, the removable annular seal ring including one or more of such radial passages;

a reactor internals assembly comprising a lower internals which includes a reactive core and an upper internals situated above the core, the internals assembly being seated within the reactor vessel, wherein the removable annular seal ring is attached to the reactor internals assembly; and a substantially annular passage between an interior wall of the reactor vessel lower portion and the internals assembly for a downward flow of relatively cool reactor coolant to access an underside of the reactive core, wherein at least a portion of the removable annular seal ring extends over the annular passage where it is attached to the reactor internals assembly, wherein the portion of the removable annular seal ring that extends over the annular passage includes axially extending openings for the passage of reactor coolant.

2. The nuclear reactor of claim wherein the axially extending openings are circumferentially spaced from the radial passages.

3. The nuclear reactor of claim wherein the removable annular seal ring is attached to the upper internals.

4. The nuclear reactor of claim 3 wherein the removable annular seal ring is removable from the reactor vessel with removal of the upper internals.

5. The nuclear reactor of claim 4 wherein at least one or more of the utility conduits are an integral part of the upper internals and include a utility disconnect outside of the reactor vessel.

6. The nuclear reactor of claim 1 wherein the annular seal ring has an upper and a lower double o-ring seals on opposite sides that mate with the reactor vessel flange on one of the opposite sides and the annular portion of the reactor vessel head on another of the opposite sides, the annular seal ring having a hole extending between the upper and lower double o-ring seals allowing leakage to be detected through both sets of seals via one reactor vessel flange leak-off line.

7. The nuclear reactor of claim 6 including one reactor vessel flange leak-off line extending from the lower double o-ring seal.

8. The nuclear reactor of claim 1 wherein the removable annular seal ring is forged from a metal having substantially the same thermal expansion properties as the reactor vessel.

9. The nuclear reactor of claim 8 wherein the removable annular seal ring is forged from either (i) carbon steel in which the surfaces in contact with reactor coolant are clad with stainless steel or (ii) Alloy 690.

10. The nuclear reactor of claim 1 including a plurality of holes axially through the annular seal ring in line with openings in the reactor vessel head and the reactor vessel flange through which studs pass that anchor the head to the flange with the seal ring captured therebetween.

11. The nuclear reactor of claim 10 wherein one or more of the radial passages extend in between two adjacent ones of the holes.

12. The nuclear reactor of claim 1 wherein the utility conduits are sealed to the radial passages on the inner diameter of the seal ring.

\* \* \* \* \*